(No Model.) 3 Sheets—Sheet 1.
J. G. BLOUNT & F. P. ROBINSON.
MACHINE FOR MAKING SMOCKING.
No. 588,099. Patented Aug. 10, 1897.
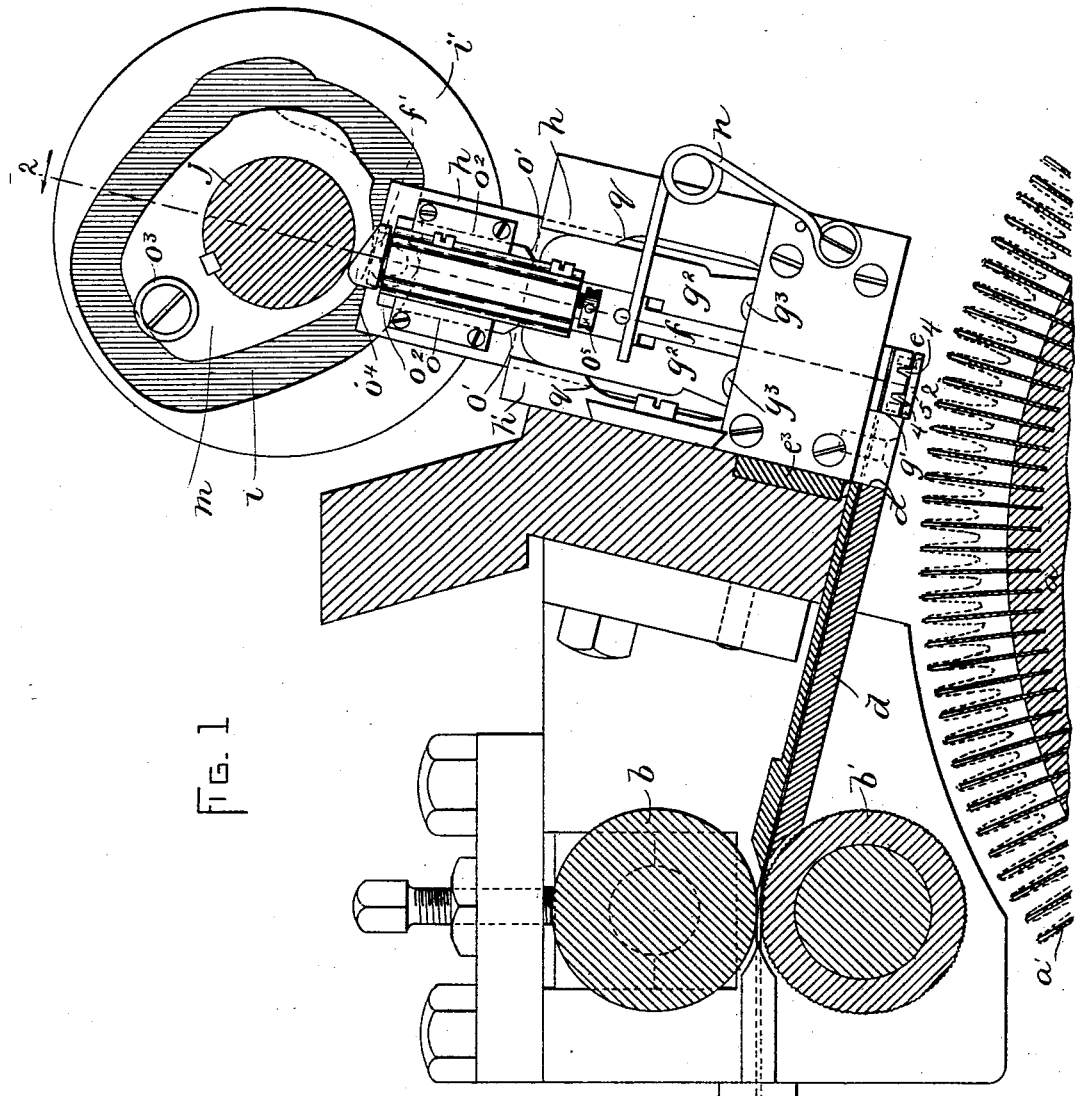
WITNESSES
A. D. Hanson
Rollin Abell
INVENTORS
F. P. Robinson
J. G. Blount
by Wright, Brown & Quinby
Attys

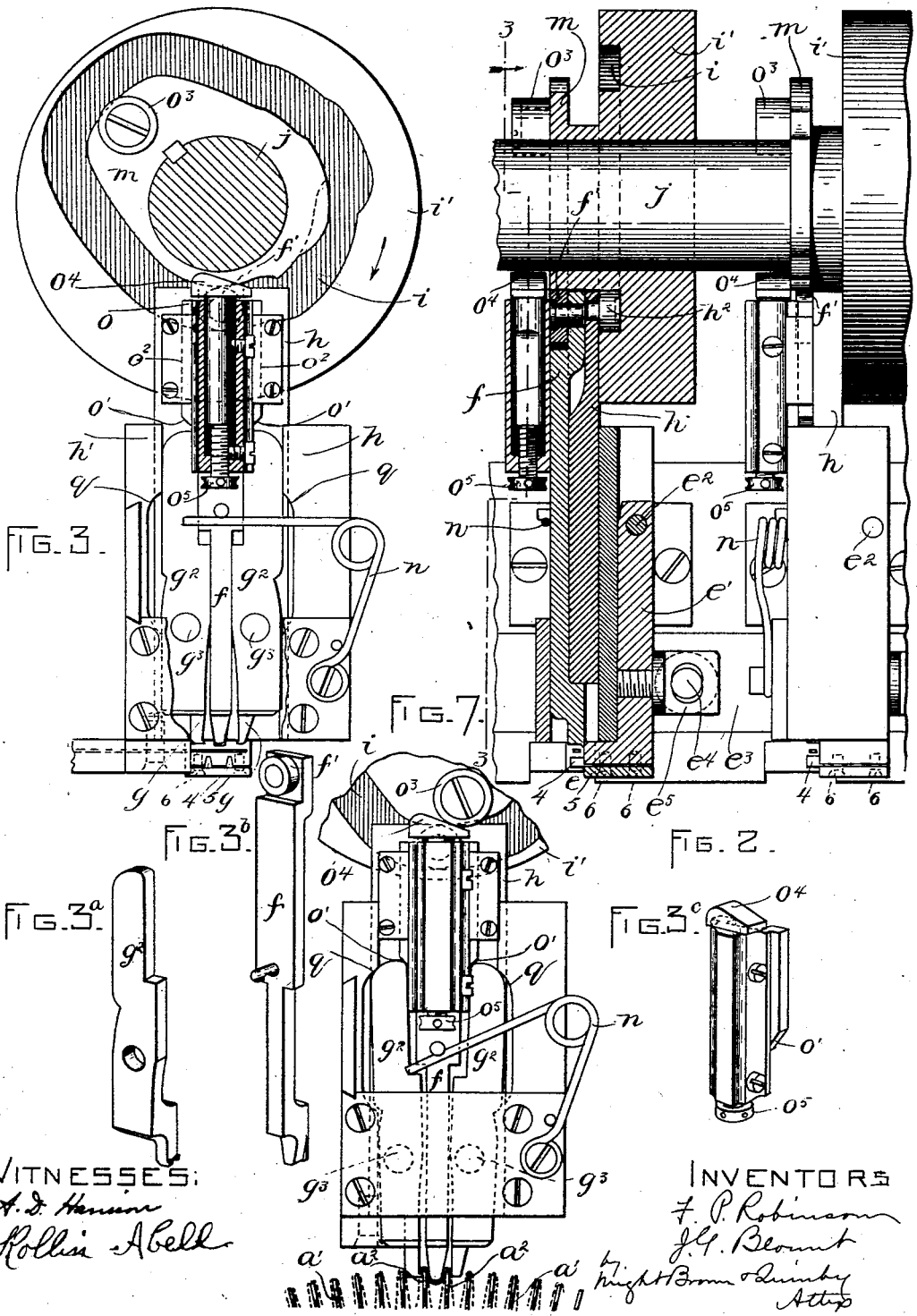

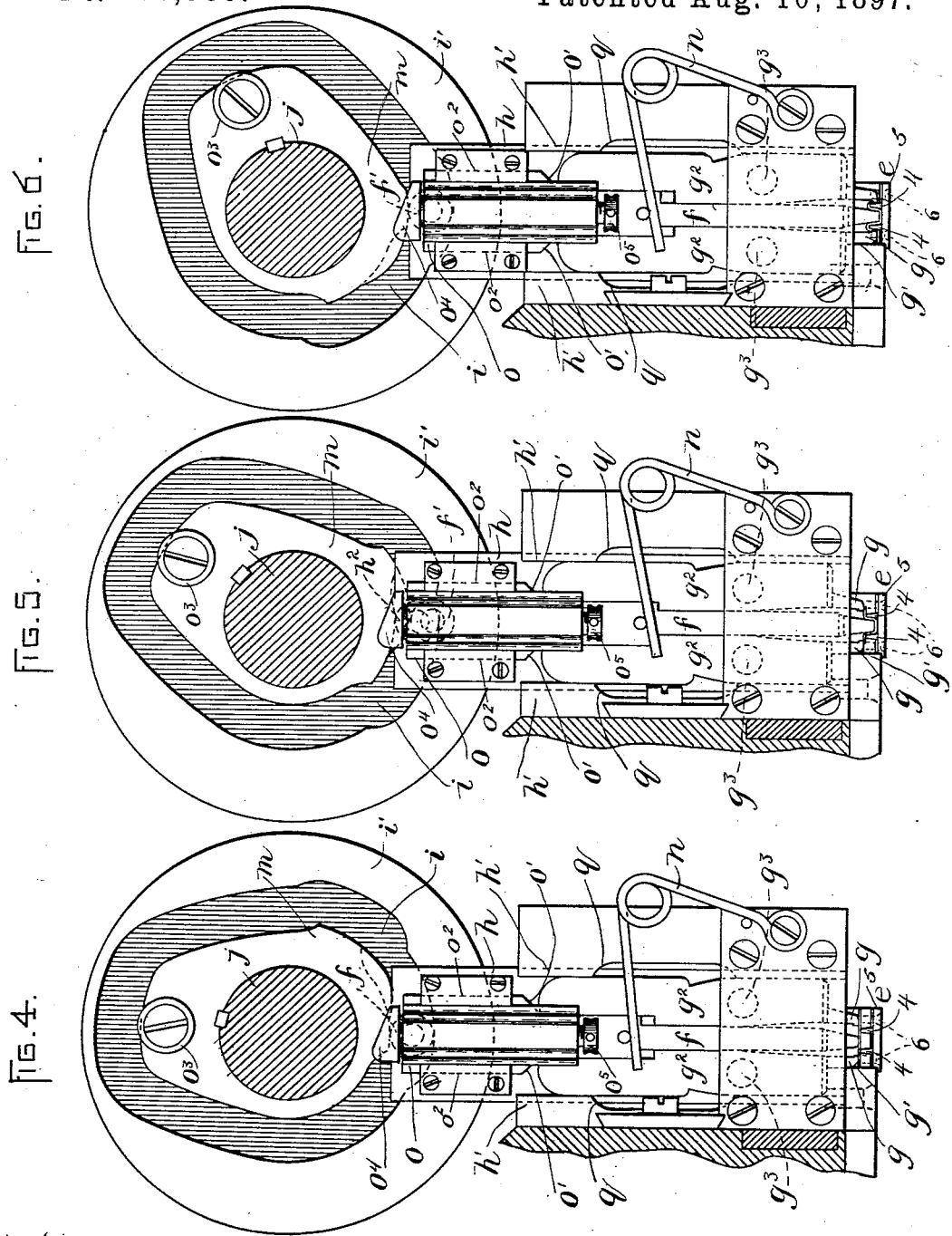

UNITED STATES PATENT OFFICE.

JOHN G. BLOUNT, OF EVERETT, AND FRED P. ROBINSON, OF BOSTON, MASSA-CHUSETTS, ASSIGNORS, BY MESNE ASSIGNMENTS, TO THE PINKHAM MANUFACTURING COMPANY, OF BOSTON, MASSACHUSETTS.

MACHINE FOR MAKING SMOCKING.

SPECIFICATION forming part of Letters Patent No. 588,099, dated August 10, 1897.

Application filed December 10, 1894. Renewed July 12, 1897. Serial No. 644,344. (No model.)

*To all whom it may concern:*

Be it known that we, JOHN G. BLOUNT, of Everett, in the county of Middlesex, and FRED P. ROBINSON, of Boston, in the county of Suffolk, in the State of Massachusetts, have invented certain new and useful Improvements in Machines for Making Smocking, of which the following is a specification.

This invention relates to mechanism for making double clasps from wire and applying the same to folds of cloth in such manner as to connect two adjacent folds and hold them slightly separated from each other, the product being the improved casket-lining or smocking shown in Letters Patent of the United States No. 521,419, dated June 12, 1894.

The invention has for its object to provide certain improvements in the means for converting wire into clasps and applying the same to the cloth; and to this end it consists in the improvements which we will now proceed to describe and claim.

Of the accompanying drawings, forming a part of this specification, Figure 1 represents a side elevation of the portion of the machine which embodies our improvements, other parts of the machine being shown in section. Fig. 2 represents a section on line 2 2 of Fig. 1. Fig. 3 represents a section on line 3 3 of Fig. 2. Figs. $3^a$, $3^b$, and $3^c$ represent perspective views of parts detached. Figs. 4, 5, and 6 represent views similar to Fig 3, showing different steps in the operation of making the clasp. Figs. 7 and 8 represent views showing the operation of applying the clasp to the cloth.

The same letters and numerals of reference indicate the same parts in all the figures.

The organized machine for making smocking to which our improvements relate is provided with a cylinder $a$, which rotates on a horizontal axis and is provided with radial blades $a'$, between which parallel folds or flutings of a piece of cloth are inserted, as indicated by dotted lines in Fig. 1. The outer edges of the blades support the folds and hold them in position to receive the wire clasps, which are made and applied by the portion of the machine which includes our improvements.

The machine is organized to make several clasps simultaneously and to simultaneously apply the clasps to the folds of the cloth, and there are therefore several sets of clasp making and applying mechanisms embodying our invention, and as they are alike in construction a description of one will suffice.

The wire $c$, from which the clasps are made, is fed to the machine by feed-rolls $b$ $b'$, the under roll $b'$ being slightly corrugated or formed to impart a roughened under surface to the wire and adapt the completed clasp to hold the cloth more firmly when applied thereto. The wire is forced by the feed-rolls (which operate intermittently) through a throat $d$, terminating in a face $d'$ at right angles to the wire, said face constituting a fixed shearing member or blade, which coöperates with a reciprocating shearing member hereinafter described in severing a blank of wire suitable for a clasp, said blank being deposited, as shown in Fig. 4, upon an anvil $e$, composed of the parallel horns or prongs 4 4, which are formed to coöperate with the bending devices hereinafter described, giving the blank the forms shown in Figs. 5 and 6. The said bending devices comprise the central die $f$ and the jaws $g$ $g$ at opposite sides of the die, said die and jaws being located above the anvil and movable toward and from the latter. The die and jaws are supported by a plate or carrier $h$, which is movable in vertical guides or ways $h'$ $h'$ and is reciprocated by a cam-groove $i$ in a disk $i'$, affixed to the driving-shaft $j$, said cam-groove receiving a trundle-roll $h^2$, Figs. 2 and 5, mounted on the carrier $h$. The jaws $g$ $g$ are affixed to levers $g^2$ $g^2$, which are pivoted at $g^3$ $g^3$ to the carrier $h$, the jaws being thus positively connected with the carrier, so that they are moved vertically thereby and at the same time are permitted to swing toward and from each other, so that they can be moved inwardly, as shown in Fig. 7, to compress the hooks of the clasp, as hereinafter described, after they have been moved downwardly to form said hooks. The jaws are thus moved inwardly by means of a slide $o$, movable in guides $o^2$ $o^2$ on the carrier, and provided with inclined faces $o'$ $o'$, which, when said slide is pressed downwardly by an eccentrically-arranged roll or projection $o^3$, bearing on a shoe $o^4$ on the slide $o$, are caused to move the upper ends of the levers $g^2$ $g^2$ outwardly, thus moving the jaws inwardly, as shown in Fig. 7, this movement taking place when the carrier $h$ is depressed. When the carrier rises, the upper ends of the levers $g^2$ $g^2$ are forced inwardly by contact of their curved upper ends with fixed inclines $q$ $q$ on the frame of the machine, the jaws being thus moved outwardly to the position shown in Figs. 3, 4, 5, and 6. The shoe $o^4$ is adjustable vertically by means of a screw $o^5$, so that the extent of its depression and the consequent inward movement of the jaws may be regulated to suit the thickness of the cloth.

The die $f$ is mounted to move independently on the carrier and between the levers $g^2$ $g^2$, and is reciprocated vertically by means of a cam $m$ on the driving-shaft and a spring $n$, arranged to press the die $f$ upwardly against the cam $m$, the die having a trundle-roll $f'$, bearing against the cam. The anvil $e$ is composed, as stated, of the horns or prongs 4 4, which are affixed to the lower ends of an arm $e'$, Fig. 2, pivoted at $e^2$ to the supporting-frame, said arm being movable, so that the anvil can be displaced from its operative position, as shown by dotted lines in Fig. 2, to permit the application of the clasp to the cloth, a slide $e^3$, which is reciprocated horizontally by a suitable connection with the driving-shaft, being employed to alternately hold the anvil in its operative and inoperative positions. Said slide is provided with a stud $e^4$, entering a slot in an ear $e^5$, affixed to the anvil-arm $e'$.

The anvil-horns 4 4 are preferably made as independent pieces or strips of metal inserted in slots formed for their reception in the arm $e'$ and secured to the arm by a clamping-plate 5, detachably held by screws 6 6. On loosening said screws the horns 4 may be moved endwise. Hence in case of breakage of the operative portion of one or both of the horns a new part of the broken horn may be brought into position for use.

The anvil-supporting arm $e'$ is arranged so that when it swings to its inoperative position the anvil-horns, swinging in the arc of a circle, will drop from the bending devices and leave the clasp thereon without the liability of displacing the clasp, which would exist if the anvil moved horizontally instead of swinging downwardly.

The operation is as follows: The wire is fed forward over the anvil, the carrier $h$, with the die and jaws, being raised. The carrier is then depressed until the shear $g'$ severs a blank from the wire, the downward movement of the carrier being then temporarily arrested, leaving the jaws bearing on the blank and above the anvil. The die $f$ then descends, bending the central portion of the blank into a loop between the parts of the anvil, as shown in Fig. 5, the ends of the blank sliding inwardly under the jaws and being prevented thereby from rising. The carrier is then given an additional downward movement, forcing the jaws downwardly and thus forming hooks in the ends of the clasp, as shown in Fig. 6. The anvil is then moved back from its operative position, and the carrier is once more moved downwardly, carrying the clasp downwardly and pressing its hooks upon two folds of cloth on the blades $a'$. The slide $o$ then descends, forcing the jaws inwardly and compressing the hooks upon the folds of cloth, the blades $a'$ having recesses $a^2$, Fig. 7, which coincide with the jaws and permit the compression of the hooks upon the folds of cloth. The carrier is then raised preparatory to another operation.

An important feature of our invention is the successive operation of the bending-die and the jaws, whereby the clasp is formed by easy degrees and tensional strain thereon avoided. Another important feature is the combination, with the wire cutting and forming mechanism, of the feed-rolls, one of which is formed to corrugate the under surface of the wire.

We do not limit ourselves to the details of mechanism herein shown and may variously modify the same without departing from the spirit of our invention.

Our invention may be embodied in a machine for making wire articles for other purposes and is not limited to a machine for making casket linings or smocking.

We claim—

1. In a machine of the character described, the combination of a two-pronged anvil, a bending-die, hook-forming jaws, mechanism for operating said die and jaws successively to form a double-hooked clasp upon the anvil, mechanism for displacing the anvil after the formation of said hooks, and means for additionally operating the jaws after the displacement of the anvil to compress the hooks.

2. In a machine of the character described, the combination of a two-pronged anvil, a fixed guiding or supporting frame, a carrier movable in said frame, jaws pivotally connected to the carrier, a bending-die independently movable on the carrier between the jaws and formed to enter the space between the prongs of the anvil, mechanism for operating the bending-die, independent mechanism for operating the carrier and jaws, said independent mechanism being organized to give the jaws first a longitudinal movement to form hooks upon the anvil and then lateral movements to compress said hooks, and means for displacing the anvil after the longitudinal movement of the jaws.

3. In a machine of the character described, the combination of wire-feed rolls one of which is formed to corrugate or roughen the wire, a wire guide or throat terminating in a fixed shear-blade, a pair of jaws one of which is formed as a movable shear-blade, a carrier for said jaws, a bending-die between the jaws, and independent mechanisms for operating said bending-die, carrier, and jaws.

4. The combination of the carrier, the jaws connected with the carrier, the bending-die between the jaws, mechanism for operating said die and jaws, an arm swinging on a horizontal axis and provided with an anvil at its swinging end, and means for swinging said arm to and from its operative position.

5. The combination with the carrier, jaws, and bending-die, of the anvil composed of removable fingers and a swinging arm pivoted to the carrier and provided with a clamp adapted to adjustably hold said fingers.

6. In a machine of the character described, the combination with wire-bending and clamp-carrying devices, of an anvil adapted to coöperate with said devices in forming the clasp, and means for giving the anvil a downward movement as it recedes, whereby displacement of the clasp on the carrying devices by the anvil is prevented.

7. In a machine of the character specified, the improved anvil composed of an arm provided with clamping devices and horns or prongs made in independent pieces adjustably secured to the arm by said clamping devices.

In testimony whereof we have signed our names to this specification, in the presence of two subscribing witnesses, this 24th day of November, A. D. 1894.

JOHN G. BLOUNT.
FRED P. ROBINSON.

Witnesses:
C. F. BROWN,
A. D. HARRISON.